United States Patent Office 3,192,225
Patented June 29, 1965

3,192,225
2-SUBSTITUTED AMINOTHIAZOLES
John D. Spivack, Spring Valley, and Martin Dexter, White Plains, N.Y., assignors to Geigy Chemical Corporation, Ardsley, N.Y., a corporation of Delaware
No Drawing. Original application Apr. 24, 1961, Ser. No. 104,805. Divided and this application Dec. 28, 1962, Ser. No. 253,017
5 Claims. (Cl. 260—306.8)

This invention relates to novel substituted thiazole compounds. In one aspect thereof, the invention comprises a first class of new substituted thiazole compounds of the formula:

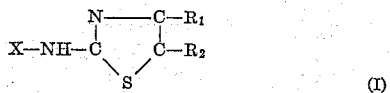

(I)

wherein $R_1$ represents alkyl having greater than 3 carbon atoms, preferably from 4 to 18 carbon atoms, e.g. butyl, pentyl, hexyl, heptyl, octyl, nonyl, decyl, hendecyl, dodecyl, pentadecyl, octadecyl, etc., substituted aryl, preferably alkylphenyl, especially alkylphenyl having from 7 to 24 carbon atoms, e.g. tolyl, ethylphenyl, propylphenyl, butylphenyl, pentylphenyl, hexylphenyl, heptyphenyl, octylphenyl, nonylphenyl, decylphenyl, hendecylphenyl, dodecylphenyl, pentadecylphenyl, octadecylphenyl, etc.;
$R_2$ represents hydrogen;
$R_1$ and $R_2$, when taken jointly, represent

—$CH_2$—$CH_2$—$CH_2$—$CH_2$— and

X represents aryl, preferably naphthyl, substituted aryl, preferably substituted phenyl, especially hydroxyphenyl, aminophenyl, alkanamidophenyl, e.g. acetamidophenyl, propionamidophenyl, caproamidophenyl, lauramidophenyl, stearamidophenyl, alkylhydroxyphenyl, e.g. methylhydroxyphenyl, ethylhydroxyphenyl, propylhydroxyphenyl, butylhydroxyphenyl, pentylhydroxyphenyl, hexylhydroxyphenyl, nonylhydroxyphenyl, dodecylhydroxyphenyl, octadecylhydroxyphenyl, etc., lower alkoxyphenyl, lower alkylaminophenyl, phenylaminophenyl, aminobiphenyl, acenaphthyl, and substituted thiazolyl of the formula:

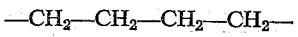

wherein $R_1$ is as above defined.

A second class of new substituted thiazoles comprises compounds of the formula:

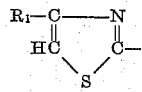

(II)

wherein $R_3$ represents alkyl, such as e.g. methyl, ethyl, propyl, butyl, pentyl, hexyl, heptyl, nonyl, decyl, hendecyl, dodecyl, octadecyl, etc., and aryl, preferably phenyl;
$R_4$ represents alkyl, preferably lower alkyl, e.g. methyl, ethyl, propyl, butyl, pentyl, and hexyl, aryl, preferably phenyl, and substituted aryl, preferably substituted phenyl, and alkanoyl, e.g. formoyl, acetyl, propionyl, butyryl, etc., caproyl, lauroyl and stearoyl, etc.; and
Y represents substituted aryl, e.g. substituted phenyl, preferably hydroxyphenyl.

A third class of new substituted thiazoles comprises compounds of the formula:

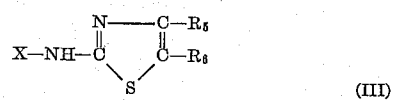

(III)

wherein $R_5$ represents hydrogen and alkyl having from 1 to 3 carbon atoms, e.g. methyl, ethyl, propyl;
$R_6$ represents alkyl, e.g. methyl, ethyl, propyl, butyl, pentyl, hexyl, octyl, dodecyl, octadecyl, etc.; and
X represents substituted aryl, preferably hydroxyphenyl.

A fourth class of new substituted thiazoles comprises compounds of the formula:

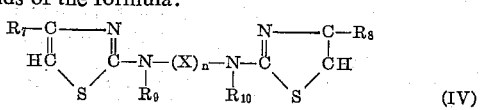

(IV)

wherein $R_7$ and $R_8$ each represents alkyl, e.g. methyl, ethyl, propyl, butyl, hexyl, octyl, dodecyl, octadecyl, etc., aryl, preferably phenyl, substituted aryl, preferably substituted phenyl, especially alkylphenyl, e.g. methylphenyl, ethylphenyl, propylphenyl, butylphenyl, octylphenyl, dodecylphenyl, octadecylphenyl, etc.;
$R_9$ and $R_{10}$ each represents hydrogen and aryl, preferably phenyl, and preferably both $R_9$ and $R_{10}$ do not represent aryl, e.g. phenyl, at the same time;
X represents arylene, preferably phenylene; and
n represents a number selected from the group consisting 1 and 2.

A fifth class of new substituted thiazoles comprises compounds of the formula:

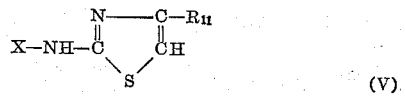

(V)

wherein $R_{11}$ represents methyl, ethyl, propyl; and
X represents aminophenyl and alkylhydroxyphenyl, e.g. methylhydroxyphenyl, ethylhydroxyphenyl, propylhydroxyphenyl, butylhydroxyphenyl, octylhydroxyphenyl, dodecylhydroxyphenyl, octadecylhydroxyphenyl, etc.

A sixth class of new substituted thiazoles comprises compounds of the formula:

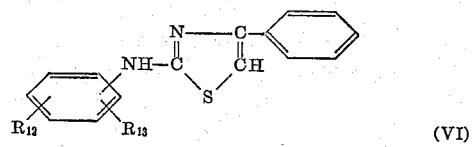

(VI)

wherein $R_{12}$ represents hydroxy, amino, alkylamino, preferably lower alkylamino, alkyl, e.g. methyl, ethyl, propyl, butyl, octyl, dodecyl, octadecyl, etc., alkanamido, e.g. formamido, acetamido, propionamido, butyramido, caproamido, lauramido, stearamido, etc.;

$R_{13}$ represents hydrogen, and, when $R_{12}$ represents alkyl, then $R_{13}$ represents hydroxy.

In this specification the term "lower alkyl" signifies an alkyl group having from 1 to 6 carbon atoms, and the expression "-t-" signifies "-tertiary-."

The novel substituted 2-aminothiazole compounds disclosed hereinabove are useful as chemical intermediates, e.g. in the synthesis of sulfathiazoles. Additionally, some of the substituted 2-aminothiazoles of the invention are useful in muscle relaxant compositions. Also, the novel 2-aminothiazoles hereinabove described are useful stabilizers for various unstable materials.

Up to the present time, the use of the foregoing classes of substituted thiazoles in stabilizing organic material, e.g. polypropylene, has not been known. It has now surprisingly been found that many organic materials are stabilized against deterioration, e.g. oxidative and/or light induced and/or thermal deterioration, by incorporating therein a stabilized quantity of a substituted thiazole according to the present invention.

The substituted thiazoles of the invention are thus also particularly useful in stabilizing lubricating oils of various types, including aliphatic esters, polyalkylene oxides, silicones, esters of phosphoric and silicic acids, highly fluorine-substituted hydrocarbons, etc.

The substituted thiazoles of the present invention are also useful in stabilizing fatty materials, including oils of animal and vegetable origin which tend to deteriorate, e.g. on standing and exposure to atmospheric oxygen; also saturated and unsaturated hydrocarbons which tend to deteriorate on storage, such as e.g. gasolines, both natural and synthetic, in particular, saturated and unsaturated gasolines, etc.; jet fuel, diesel oil, mineral oil, fuel oil, drying oil, waxes, resins, etc.

A particularly effective stabilizer of the invention is 2,2'-imino-bis-4-(p-t-butylphenyl)-thiazole which is especially useful in stabilizing polyolefinic materials, e.g. polypropylene. Another especially valuable stabilizer is 2-(p-aminoanilino)-4-t-butylthiazole which is an effective stabilizer for relatively unstable organic material, e.g. waxes, particularly paraffin wax, hydrocarbon oil of mineral origin, in particular, mineral oil; gasoline, both natural and synthetic; oil of animal origin, in particular, lard; oils of vegetable origin, in particular, cotton seed oil. Still another valuable stabilizer is 2-(m-aminoanilino)-4-t-butylthiazole which is especially effective in stabilizing polymeric material, e.g. polyethylene and aldehydes, such as heptaldehyde. Other preferred stabilizers are 2-(m-hydroxyanilino)- and 2-(p-hydroxyanilino)-4-t-butylthiazole which are particularly useful in stabilizing elastomers, both natural and synthetic, e.g. polyisoprene rubber.

The choice of a specific substituted thiazole for stabilization of a given unstable material will depend upon several factors. Availability and cost of raw materials for the manufacture of the stabilizer and effective inhibitory action of the stabilizer, including duration and degree of activity, are among the factors which control the choice of a specific stabilizer for a specific substrate which is normally subject to oxidative deterioration. Toxicity, color, stability to light and solubility are also important factors.

In general, the stabilizers of the invention are employed in a concentration of from about 0.001% to about 5% by weight, preferably from about 0.01% to about 1% by weight, based on the total weight of the stabilized material. The specific concentration used varies with the substrate and the stabilizer, but the following generalizations can be made.

Concentrations of about 0.001% to about 0.1% by weight of the antioxidant in polyethylene are useful. In polypropylene, from about 0.05% to about 1% by weight of the stabilizer are used. For polystyrene, from about 0.1% to about 1% by weight is useful. In rubber, concentrations of from about 0.05% to about 1% are useful.

In mineral oils, concentrations of from about 0.005% to about 1% by weight of stabilizer are used. Gasolines are stabilized with from about 0.01% to about 0.1% by weight of stabilizer, preferably 0.05% by weight. Fatty material of animal origin, such as lard, is stabilized with from about 0.001% to about 0.1% by weight of stabilizer. Oils of vegetable origin, such as cotton seed oil, are stabilized with from about 0.001% to about 0.1% by weight of stabilizer.

Hydrocarbon material, such as cycloolefins, e.g. cyclohexene, is advantageously stabilized with from about 0.001% to about 1% by weight of the stabilizers of the present invention. The same concentrations of stabilizer are used to stabilize aldehydes, such as e.g. about 0.01% by weight of stabilizer in heptaldehyde. High temperature lubricants which are essential diesters, e.g. diisoamyladipate, are stabilized with from about 0.5% to about 5%, preferably about 2% by weight of a stabilizer according to the invention.

The compounds of this invention may also be used to stabilize organic material in combination with other additive agents, such as e.g. antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, UV absorbers, dyes and pigments, etc.

The thiazoles of the invention which are useful as stabilizers are prepared advantageously by the reaction of arylthioureas with halocarbonyl compounds, as in reaction (1) below. Alternatively, an arylamine is reacted with a 2-aminothiazole to produce a 2-arylaminothiazole according to reaction (2) below. Still further, an arylamine can be reacted with a 2-halothiazole according to reaction (3) below.

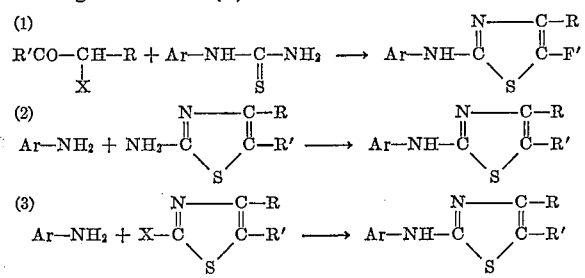

A fourth alternate synthesis includes the following reaction:

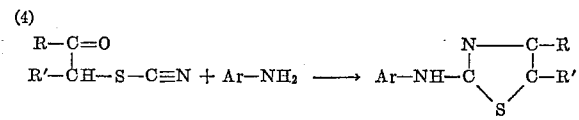

In the foregoing reaction schemes, X stands for halogen, Ar represents aryl; and R and R' are any suitable group in accordance with the desired compounds according to the present invention.

The sources of the α-halocarbonyl compounds of reaction (1) are illustrated below in Table I.

The aromatic thioureas which are used to prepare some of the compounds of the invention are made by known procedures involving the reaction of aromatic amines with either sodium, potassium or ammonium thiocyanates in acidic media:

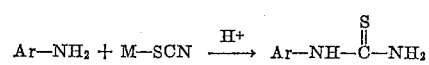

wherein Ar is an aromatic nucleus which may be substituted or unsubstituted, and M is the sodium, potassium or ammonium ion. A substantial number of these thioureas have been previously characterized in the literature, e.g. as shown in Table II, whereas Table III illustrates some intermediates not previously characterized in the literature.

TABLE I

*α-Halocarbonyl compounds used as intermediates in the invention*

| Compound | Structure | Reference or source |
|---|---|---|
| 1-bromo-3,3-di-methylbutanone-2 | $(CH_3)_3C-\overset{O}{\underset{\|}{C}}-CH_2-Br$ | J. B. Dickey et al., J. Org. Chem. 20 499–500 (1955). |
| 1-bromotridecanone-2 | $CH_3(CH_2)_{10}\overset{O}{\underset{\|}{C}}-CH_2Br$ | Lutz et al., J. Org. Chem. 12 767 (1947). |
| α-bromo-heptaldehyde | $CH_3(CH_2)_4\underset{\underset{Br}{\|}}{CH}CHO$ | Yanovskaya et al., J. Gen. Chem. (USSR) 22 1598–1602 (1952) (C.A. 1953 9257). |
| 4,4-dimethyl-3-chloropentanone-2 | $(CH_3)_3C\underset{\underset{Cl}{\|}}{CH}\overset{O}{\underset{\|}{C}}CH_3$ | Fierens, Bull. Soc. Chim. Belg. 64 772 (1955). |
| p-t-butyl-phenacyl chloride | $Cl-CH_2-CO-\langle\rangle-t-C_4H_9$ | Ritter and Sokol, J. Am. Chem. Soc. 70 3419–21 (1948). |
| p-n-dodecylphenacyl chloride | $ClCH_2CO-\langle\rangle-n-C_{12}H_{25}$ | Using method of Auers Ber. 34 3757 (1906) who prepared p-ethylphenacyl chloride. |

TABLE II

*N-aryl substituted thiourea compounds used as intermediates in the invention*

| Aryl substituent | M.P., °C. | Literature reference |
|---|---|---|
| 4-NH₂-phenyl | 167–168 | Masao Shimotani, J. Pharm. Soc. Japan 72 328–30 (1952) (C.A. *1953* 1627b, d). |
| 3-NH₂-phenyl | 190 | Masao Shimotani, Loc. Cit. |
| 2-NH₂-phenyl | ---------- | B. Arventiev et al., Adac. Rep. populare Romani, Filala Iasi, Studii cercetari stiint 4 No. 1–2, 234–43 (1953) (C.A. 1956, 15894). |
| 4-OH-phenyl | 161 | Masao Shimotani, Loc. Cit. |
| 3-OH-phenyl | 214 | Masao Shimotani, Loc. Cit. |
| 2-OH-phenyl | 176 | Beyerman and Bontekoe, Rc. Trav. chim. 72 643–52 (1953) (C.A. 1954 9966a). |
| naphthyl | 180–181 | K. S. Bhatki and M. B. Kabadi, J. Univ. Bombay 24A, 17–21 (1956) (C.A. 1957 11159). |

TABLE II—Continued

| Aryl substituent | M.P., °C. | Literature reference |
|---|---|---|
| 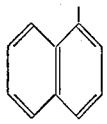 | ......... | Ryohei Oda and Ryoichi Sakurei, J. Chem. Soc. Japan, Ind. Chem. Sect. 53, 200-2 (1950) (C.A. 1950 3285b). |
| (C₂H₅)₂N—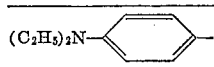— | 132–133 | A. B. Wang, Scientia Sinica (Peking) 3, 301–4 (1954), (C.A. 1956 8496a). |

TABLE III

*Aromatic thioureas used as intermediates in the invention*

| Compound: | M.P., °C. |
|---|---|
| 1-(2-hydroxy-5-t-octylphenyl)-2-thiourea | 160–161 |
| 1-(p-aminobiphenyl)-2-thiourea | 270 |
| 1,1'-p,p'-biphenylene-bis-2-thiourea | 270 |
| 1-(p-anilinophenyl)-2-thiourea | 198 |
| 1-phenyl-1,1'-p-phenylene-bis-2-thiourea | 218 |
| 1-(p-acetamidophenyl)-2-thiourea | 204–205 |
| 1-(m-acetamidophenyl)-2-thiourea | 194–195 |
| 1-(p-lauramidophenyl)-2-thiourea | 196–208 |
| 1-(p-stearamidophenyl)-2-thiourea | 202–206 |
| 1-(p-aminophenyl)-1-methyl-2-thiourea | 177–178 |

The methods of preparing the compounds of the invention will be more clearly understood from the examples which illustrate the invention, but are not meant to limit the same thereto. In the examples, temperatures are in degrees centigrade and parts are by weight, unless otherwise noted. The relationship of parts by weight to parts by volume is as that of grams to cubic centimeters.

2-ARYLAMINO-4-ARYLTHIAZOLES

*Example 1.—2-(o-methoxyanilino)-4-phenylthiazole*

Phenacyl chloride (15.4 parts, is dissolved in 50 parts by volume of benzene and added to a dispersion of 18.2 parts of o-methoxyphenylthiourea in 150 parts by volume of ethanol. The reaction mixture is heated at reflux (about 75°) for several hours. The reaction mixture is then diluted with 300 parts of water and neutralized with saturated aqueous sodium bicarbonate solution and the product is extracted with ether. After drying the ether solution over anhydrous sodium sulfate, the product is isolated, removing the ether by distillation. The residue from ether is recrystallized from isopropanol yielding 22 parts of 2-o-methoxyanilino-4-phenyl-thiazole (M.P. 85–86°).

*Examples 2–10.—2-substituted amino-4-phenylthiazoles*

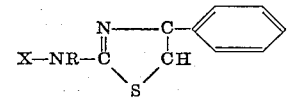

In an analogous manner to Example 1, the following products were made:

| Ex. No. | Subst. phenylthiourea | | | Phenacyl-chloride, parts by wt. | Product, parts by wt. | M.P., °C. | Crystallization solvent |
|---|---|---|---|---|---|---|---|
| | X | R | Parts by wt. | | | | |
| 2 |  —OH | H | 16.8 | 15.4 | 19.0 | 179–180 | Benzene. |
| 3 |  —NH₂ | H | 16.7 | 15.4 | 12.0 | 163–165 | Isopropanol. |
| 4 | NH₂—— | H | 16.7 | 15.4 | 15.0 | 133–135 | Benzene. |
| 5 |  —OH | H | 16.8 | 15.4 | 14.0 | 123–125 | Ethylene chloride. |
| 6 |  —NH₂ | H | 16.7 | 15.4 | 15.0 | 160–162 | Isopropanol. |
| 7 | OH— |  | 11.0 | 6.20 | 14.9 | 152–153 | Benzene. |

| Ex. No. | Subst. phenylthiourea X | Subst. phenylthiourea R | Subst. phenylthiourea Parts by wt. | Phenacyl-chloride, parts by wt. | Product, parts by wt. | M.P., °C. | Crystallization solvent |
|---|---|---|---|---|---|---|---|
| 8 | 2,6-di-t-$C_4H_9$-4-OH-phenyl | H | 5 | 2.74 | 4.0 | 192–194 | Petroleum ether. |
| 9 | 2-OH-5-t-$C_8H_{17}$-phenyl | H | 14 | 7.7 | 21.0 | 159–160 | Benzene-hexane. |
| 10 | 4-($N,N$-di-$C_2H_5$-amino)phenyl | H | 11.5 | 7.7 | 7.5 | 149–150 | Benzene. |

*Example 11.—2-p-hydroxyanilino-4-phenylthiazole*

2-p-hydroxyanilino-4-phenylthiazole (5 parts), melting at 203° upon recrystallization from isopropanol, is obtained by reacting 22 parts of p-aminophenol with 15 parts of 2-amino-4-phenylthiazole hydroiodide in 250 parts by volume of ethylene glycol at 185° under nitrogen.

*Example 12.—2-(p-acetamidophenylamino)-4-phenylthiazole*

Phenacyl chloride (7.7 parts) is dissolved in 35 parts by volume of benzene and added at room temperature with stirring to a dispersion of p-acetamidophenylthiourea (10.5 parts) in methyl Cellosolve (100 parts by volume). The reaction mixture is then heated at about 80° (±5°) for 4 hours, then cooled and filtered. The solid obtained (15.3 parts, 88%) is recrystallized once from ethanol, having a melting point of 255–257°. The hydrochloride, so obtained, is then suspended in 100 parts by volume of ethanol and brought to pH 8 with saturated aqueous sodium bicarbonate, stirred for one hour, filtered and washed with water. The 2-(p-acetamidophenylamino)-4-phenylthiazole is recrystallized repeatedly from isopropanol until a constant melting point of 179–180° is reached.

*Example 13.—2-(m-acetamidophenylamino)-4-phenylthiazole*

This compound is made substantially as described in Example 12 for the p-acetamido analog. The residue from ether weighs 18.5 parts. Recrystallization from a mixture of ethylene chloride and benzene yields 2-(m-acetamidophenylamino)-4-phenylthiazole, melting at 145–146°.

*Example 14.—2-(p-lauramidophenylamino)-4-phenylthiazole*

This compound is made substantially as described in Example 12 for the p-acetamido analog, by reacting 17.5 parts of 1-(p-lauramidophenyl)-2-thiourea with 7.7 parts of phenacyl chloride. After neutralization with aqueous sodium bicarbonate, the product is extracted with chloroform. The 2-(p-lauramidophenylamino)-4-phenylthiazole is isolated by distillation of the solvent. After recrystallization from benzene, the 2-(p-lauramidophenylamino)-4-phenylthiazole melts at 150–151°.

*Example 15.—2-(p-lauramidophenylamino)-4-p-t-butylphenylthiazole*

This compound is made substantially as described in Example 14 for 2-(p-lauramidophenylamino)-4-phenylthiazole by reacting 17.5 parts of 1-(p-lauramidophenyl)-2-thiourea with 10.5 parts of p-t-butylphenacyl chloride. The 2-(p-lauramidophenylamino)-4-p-t-butylphenylthiazole, thus obtained (17.3 parts), melts at 163.5–164.5° after recrystallization from benzene.

*Example 16.—2-(p-stearamidophenylamino)-4-phenylthiazole*

This compound is made substantially as described in Example 12 for the p-acetamido analog, by reacting 15 parts of 1-(p-stearamidophenyl)-2-thiourea with 5.3 parts of phenacyl chloride. The 2-(p-stearamidophenylamino)-4-phenylthiazole is isolated by filtering and drying the precipitate obtained on neutralization with aqueous sodium bicarbonate. After recrystallization from chloroform, the 2-(p-stearamidophenylamino) - 4 - phenylthiazole (12.6 parts) melts at 146–147.5°.

*Example 17.—2-(N-lauroyl-2-hydroxy-5-t-octylphenylamino)-4-phenylthiazole*

3.1 parts of lauroyl chloride, dissolved in 15 parts by volume of dioxane, are added dropwise at 28° during 10 minutes to a solution of 5.5 parts of the compound described in Example 9 and 1.1 parts of pyridine dissolved in 35 parts by volume of dioxane. The reaction mixture is heated at 35° to 40° for 1 hour and then poured into 300 parts of water. The dispersion is extracted with ether and dried over anhydrous sodium sulfate. The residue, after distillation of the ether (7 parts), is crystallized successively from 75 parts by volume of hexane, containing 5 parts of benzene, from carbon tetrachloride, and from hexane. The 2-(N-lauroyl-2-hydroxy-5-t-octylphenylamino)-4-phenylthiazole, thus obtained, melts at 106.5–108°.

If, in Example 17, acetyl chloride (1.09 parts) is substituted for lauroyl chloride, then 2-(N-acetyl-2-hydroxy-5-t-octylphenylamino)-4-phenylthiazole is obtained.

If, in Example 17, stearoyl chloride (4.23 parts) is substituted for lauroyl chloride, then 2-(N-stearoyl-2-hydroxy-5-t-octylphenylamino)-4-phenylthiazole is obtained.

*Example 18.—2-(p-acetamidophenylamino)-4-(p-t-butylphenyl)-thiazole*

This compound is made using p-t-butylphenacyl chloride, described by Ritter et al., J. Am. Chem. Soc. 70 3419 (1948), the other reagents being the same as described in Example 12. The reaction is run under the same conditions as above (4 hours 80° ± 5°). Filtration yields 16.5 parts (90%) of solid. In this case the free amine is obtained directly. Recrystallization from aqueous ethanol yields 2-(p-acetamidophenylamino)-4-(p-t-butylphenyl)-thiazole, having a melting point of 198–200°.

*Example 19.—2-(m-acetamidophenylamino)-4-(p-t-butylphenyl)-thiazole*

This compound is made substantially as described in Example 18 for the p-acetamido analog. The residue from a mixture of ethylene chloride and benzene yields a product melting at 139–140°.

*Example 20.—2-(α-naphthylamino)-4-(p-t-butylphenyl)-thiazole* p-t-Butylphenacyl chloride (11 parts) is dissolved in 35 parts by volume of benzene and added to a dispersion of 10 parts of α-naphthylthiourea in 150 parts by volume of ethanol over a period of 20 minutes at 50°. The reaction mixture is then heated at reflux (about 75°) for 3 hours, diluted with about 500 parts of water, then made alkaline with 100 parts by volume of 10% aqueous sodium hydroxide and finally extracted first with ether and then with benzene. The combined extracts are dried over anhydrous sodium sulfate. The residue, obtained by distillation of the solvent at reduced pressure (10 parts), is recrystallized from benzene. 2-(α-naphthylamino)-4-(p-t-butylphenyl)-thiazole is obtained as white crystals melting at 214–215°.

*Example 21.—2-(p-diethylaminoanilino)-4-(p-t-butylphenyl)-thiazole* p-t-Butylphenacyl chloride (13.0 parts) is dissolved in 25 parts by volume of benzene and added to 13 parts of p-diethylaminophenylthiourea dispersed in 100 parts by volume of ethanol over a period of 10 minutes at 50°. The reaction mixture is heated at reflux for 3 hours, diluted with about 300 parts by volume of water and made basic with 50 parts by volume of 10% aqueous sodium hydroxide. The precipitate is filtered, washed with ether to give 18 parts of 2-(p-diethylaminoanilino)-4-(p-t-butylphenyl)-thiazole, melting at 230°. The product is crystallized from benzene and melts at 231–233°, as slightly off-white crystals.

*Example 22.—2-[(p-anilino)-phenylamino]-4-(p-t-butylphenyl)-thiazole* p-t-Butylphenacyl chloride (10.5 parts) is dissolved in 25 parts by volume of benzene and added dropwise at 28° over a period of 10 minutes to a dispersion of p-(anilino)-phenylthiourea in 77 parts by volume of methyl Cellosolve. The reaction mixture is heated at 80° for 3½ hours, cooled and diluted with 100 parts by volume of 5% aqueous sodium bicarbonate, the precipitated product being extracted with ether. The ether extract is washed with water, dried over sodium sulfate, the ether being removed by distillation at about 15 mm. Hg pressure. The 2-[(p-anilino)-phenylamino]-4-(p-t-butylphenyl)-thiazole (19 parts), crystallized from isopropanol, melts at 162–163°.

*Example 23.—2-(p-amino-N-methylanilino)-4-(p-t-butylphenyl)-thiazole*

To a solution of 7.83 parts of 1-(p-aminophenyl)-1-methyl-2-thiourea in 100 parts by volume of methyl Cellosolve at 70–75° is added a solution of 9.1 parts of p-t-butylphenacyl chloride in 35 parts by volume of benzene over 15 minutes. The reaction is essentially complete after 3.5 hours at 70–75°. After cooling, the reaction is neutralized with aqueous sodium bicarbonate and the product is isolated by extraction with ether. The residue (15.9 parts), after removal of the ether, is recrystallized successively from a solvent mixture of benzene and hexane, and thereafter from ethanol. The 2-(p-amino-N-methylanilino) - 4 - (p-t-butylphenyl)-thiazole, so obtained, has a melting point of 161–162°.

If, in Example 23, 1-(p-aminophenyl)-1-hexyl-2-thiourea (15.1 parts) is substituted for 1-(p-aminophenyl-1-methyl)-2-thiourea, then 2 - (p-amino-N-hexylanilino)-4-(p-t-butylphenyl)-thiazole is obtained.

*Example 24.—2-[4-(p-aminophenyl)-phenylamino]-4-(p-t-butylphenyl)-thiazole* p-t-Butylphenacyl chloride (4.2 parts) is dissolved in 21 parts by volume of benzene and added dropwise over a period of 10 minutes at 28° to a dispersion of 4-(p-aminophenyl)-phenylthiourea (6 parts) in 72 parts of methyl Cellosolve. The dispersion is heated for 6 hours at 80°, then diluted with 100 parts by volume of 5% aqueous sodium bicarbonate extracted with ether. The product, after removal of ether at 15 mm. Hg pressure, weighs 7 parts and is crystallized successively from benzene, a mixture of isopropanol-benzene, and benzene once again. The 2-[4-(p-aminophenyl)-phenylamino]-4-(p-t-butylphenyl)-thiazole, so obtained, melts at 187–188°.

*Example 25.—2-(p-aminoanilino)-4-(p-n-dodecylphenyl)-thiazole* p-n-Dodecylphenacyl chloride (8.1 parts), obtained according to Auer [Ber. 39 3757–64 (1906)] using n-dodecylbenzene, is dissolved in 25 parts by volume of benzene and added to a dispersion of 4.2 parts of p-aminophenylthiourea in 100 parts by volume of ethanol. The reaction mixture is heated at reflux (75°) over a period of 2 hours in a nitrogen atmosphere. The reaction mixture is neutralized with base, extracted with ether, the ether extract being washed with water and then dried over anhydrous sodium sulfate. The residue, obtained after distillation of the ether (10 parts), is recrystallized from isopropanol. The 2-(p-aminoanilino) - 4 - (p-n-dodecylphenyl)-thiazole, thus obtained, melts at 121°.

If, in Example 25, 3-t-butyl-4-hydroxyphenylthiourea (5.3 parts) is substituted for p-aminophenylthiourea, then 2-(3-t-butyl-4-hydroxyphenyl) - 4 - (p-n-dodecylphenyl)-thiazole is obtained.

If, in Example 25, 3-n-dodecyl-4-hydroxyphenylthiourea (8.4 parts) is substituted for p-aminophenylthiourea, then 2-(3-n-dodecyl - 4 - hydroxyphenyl)-4-(p-n-dodecylphenyl)-thiazole is obtained.

If, in Example 25, 3-n-octadecyl-4-hydroxyphenylthiourea (10.5 parts) is substituted for p-aminophenylthiourea, then 2-(3-n-octadecyl - 4 - hydroxyphenyl)-4-(p-n-dodecylphenyl)-thiazole is obtained.

If, in Example 25, p-n-octadecylphenacyl chloride (10.2 parts) is substituted for p-n-dodecylphenacyl chloride, then 2 - (p-aminoanilino)-4-(p-n-octadecylphenyl)-thiazole is obtained.

*Examples 26–30.—Substituted 2-amino-4-p-n-dodecylphenylthiazoles*

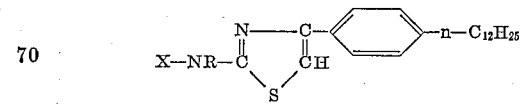

In analogous manner to Example 25 the following compounds were prepared:

| Ex. No. | Subst. Phenylthiourea X—NR—C(S)—NH₂ X | R | Parts by wt. | p-n-Dodecyl-phenacyl chloride, parts by wt. | Product, yield, parts by wt. | M.P., °C. | Crystallization solvent |
|---|---|---|---|---|---|---|---|
| 26 | phenyl-OH | H | 5 | 8.1 | 9.0 | 140 | Isopropanol. |
| 27 | HO-phenyl | H | 4.2 | 8.1 | 10.0 | 136–137 | Benzene. |
| 28 | H₂CO-phenyl | H | 4.5 | 8.1 | 11.5 | 106 | Benzene-hexane. |
| 29 | phenyl-NH₂ | H | 5 | 8.1 | 3 | 122–124 | Isopropanol. |
| 30 | H₂N-biphenyl | H | 7.29 | 9.6 | 2.9 | 170–175 | Isopropanol chloroform. |

2-ACENAPHTHYLAMINO SUBSTITUTED THIAZOLES

*Example 31.—2-(5-acenaphthylamino)-4-(p-t-butylphenyl)-thiazole* p-t-Butylphenacyl chloride (10.5 parts), dissolved in 25 parts by volume of benzene is added dropwise at 27° over a period of 10 minutes to a dispersion of 11.4 parts of 1-(5-acenaphthyl)-2-thiourea in 75 parts by volume of ethanol. The reactants are heated at 75° for 3 hours and then diluted with about 300 parts of water. The resultant aqueous dispersion is neutralized with aqueous ammonium hydroxide to pH 9 to 10 and extracted several times with benzene, the combined extracts being washed with water and then dried over anhydrous sodium sulfate; the sodium sulfate is filtered off and the filtrate is distilled. During the removal of benzene by distillation at about 15 mm. Hg pressure, the 2-(5-acenaphthylamino)-4-(p-t-butylphenyl)-thiazole separates (14 parts), melting at 196–198°. On recrystallization from a solvent mixture of benzene and hexane, the 2-(5-acenaphthylamino)-4-(p-t-butylphenyl)-thiazole melts at 198–200°.

2,2'-IMINO-BIS-(4-SUBSTITUTED THIAZOLES)

*Example 32.—2,2'-imino-bis-4-(p-t-butylphenyl)-thiazole* p-t-Butylphenacyl chloride (21 parts) is dissolved in 35 parts by volume of benzene and added dropwise at 55° to a dispersion of 6.7 parts of 2,4-dithiobiuret in 100 parts by volume of ethanol. The reaction mixture is heated at reflux (75°) for 3 hours in a nitrogen atmosphere. The reaction mixture is then diluted with 300 parts of water and treated thoroughly with saturated sodium bicarbonate (about 200 parts). The aqueous dispersion is extracted with ether, the ether extract being washed with water and dried over anhydrous sodium sulfate. The residue, obtained on distillation of the ether (26 parts), is recrystallized from a solvent mixture of benzene and isopropanol. The 2,2'-imino-bis-4-(p-t-butylphenyl)-thiazole, so obtained, melts at 256–257°.

If, in Example 32, p-n-octadecylphenacyl chloride (40.6 parts) is substituted for p-t-butylphenacyl chloride, then 2,2'-imino-bis-4-(p-n-octadecylphenyl)-thiazole is obtained.

*Example 33.—2,2'-imino-bis-(4-hendecylthiazole)*

α-Bromotridecanone (11.1 parts), dissolved in 35 parts by volume of benzene, is added over a period of 15 minutes at 28° to a dispersion of dithiobiuret (2.7 parts) in 100 parts by volume of ethanol containing 3.2 parts of pyridine. The reaction temperature during addition rises to a maximum of 32°, whereupon the reaction mixture is heated at reflux (about 75°) for two hours. The reaction mixture is diluted with about 200 parts of water and extracted with ether, the ether extract being washed with water and aqueous sodium bicarbonate and dried over anhydrous sodium sulfate. The product (10 parts), obtained by distillation of the solvent, is dissolved in hexane and filtered free of a minor amount of hexane-insoluble material. The hexane filtrate is treated twice with activated carbon and the 2,2'-imino-bis-(4-hendecylthiazole) crystallizes on cooling, melting at 79–80°. After recrystallization from isopropanol, the 2,2'-imino-bis-(4-hendecylthiazole) melts at 80–81°.

*Examples 34–50.—2,2'-imino-bis-(4-substituted thiazoles)*

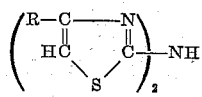

The following compounds were prepared in a manner analogous to Example 32:

(6.5 parts) is substituted for chloropropanone, then 2-(p-aminoanilino)-4-hexylthiazole is obtained.

| Ex. No. | 2,4-dithio-biuret, parts by wt. | α-Haloketone | | Product yield | | | Crystallization solvent |
|---|---|---|---|---|---|---|---|
| | | | Parts by wt. | R | Parts by wt. | M.P., °C. | |
| 34 | 6.7 | α-Bromopinacolone | 17.9 | $(CH_3)_3C-$ | 13 | 114–115 | Ethanol water. |
| 35 | 3.5 | p-n-Dodecylphenacyl chloride. | 16.2 | 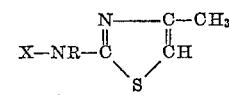 | 11.5 | 104–105 | Isopropanol. |

2-ARYLAMINO-4-ALKYL THIAZOLES

*Example 36.—2-(p-aminoanilino)-4-methylthiazole*

Chloropropanone (7 parts) is dissolved in 25 parts by volume of benzene and added to a dispersion of 12 parts of p-aminophenylthiourea in 150 parts by volume of ethanol. The reaction mixture is heated at reflux (about 75°) for several hours. The reaction mixture is then neutralized with saturated sodium bicarbonate solution, and the product is extracted with ether. After drying the ether solution over anhydrous sodium sulfate, the product is isolated by removing the ether by distillation. The residue from ether weighs 7 parts and is recrystallized from benzene. The 2-p-aminoanilino-4-methylthiazole, so obtained, melts at 140–141°.

If, in the foregoing Example 36, 1-chlorooctanone-2

*Examples 37–40.—Substituted 2-amino-4-methylthiazoles*

$$X-NR-C\underset{S}{\overset{N\rule{1em}{0.4pt}C-CH_3}{\underset{\|}{\|}}}CH$$

The following compounds were prepared in an analogous manner to Example 36:

| Ex. No. | Subst. phenylthiourea $X-\overset{S}{\overset{\|}{C}}-NH_2$ | | | 1-chloro-propanone, parts by wt. | Product yield, parts by wt. | M.P., °C. | Crystallization solvent |
|---|---|---|---|---|---|---|---|
| | X | R | Parts by wt. | | | | |
| 37 | phenyl with -NH₂ | H | 18.0 | 10.0 | 4.0 | 147–148 | Isopropanol. |
| 38 | phenyl with NH₂ | H | 16.7 | 9.2 | — | ¹ Liquid | |
| 39 | OH-phenyl-t-C₈H₁₇ | H | 11.0 | 3.6 | 11.0 | 158–160 | Cyclohexane. |
| 40 | $(CH_3)_3C-$ OH phenyl $-C(CH_3)_3$ | H | 5.0 | 1.7 | 4.0 | 174–175 | Benzene-hexane. |

¹ Analysis.—Calculated: C, 58.53%; H, 5.38%; N, 20.48%. Found: C, 58.32%; H, 5.70%; N, 20.24%.

*Example 41.—2-(p-aminoanilino)-4-t-butylthiazole*

1-bromo-3,3-dimethylbutanone-2 (9.0 parts), whose preparation is described by J. B. Dickey et al., J. Org. Chem. 20 499–500 (1955), is dissolved in 25 parts by volume of benzene and is added to a dispersion of p-aminophenylthiourea (9.0 parts) in 75 parts by volume of ethanol at about 50° over a period of about 10 minutes. The reaction mixture is heated at reflux for 3 hours, neutralized with base and extracted with ether, the ether extract being dried over anhydrous sodium sulfate. The residue obtained after distillation of the ether weighs 16.9 parts and is recrystallized from benzene. The 2-(p-aminoanilino)-4-t-butylthiazole, thus isolated, melts at 145–146°.

If, in the foregoing Example 41, 1-chlorodecanone-2 (9.5 parts) is substituted for 1-bromo-3,3-dimethylbutanone-2, then 2-(p-aminoanilino)-4-octylthiazole is obtained.

If, in Example 41, 2-hydroxy-5-dodecylphenylthiourea (18.3 parts) is substituted for p-aminophenylthiourea, then (2-hydroxy-5-dodecylanilino)-4-t-butylthiazole is obtained.

If in Example 41, 2-hydroxy-5-octadecylphenylthiourea (21.0 parts) is substituted for p-aminophenylthiourea, then (2-hydroxy-5-octadecylanilino)-4-t-butylthiazole is obtained.

If, in Example 41, 1-chloroeicosanone-2 (16.5 parts) is substituted for 1-bromo-3,3-dimethylbutanone-2, then 2-(p-aminoanilino)-4-octadecylthiazole is obtained.

If, in Example 41, 1-chlorotetradecanone-2 (12.3 parts) is substituted for 1-bromo-3,3-dimethylbutanone-2, then 2-(p-aminoanilino)-4-dodecylthiazole is obtained.

*Examples 42–52.—Substituted 2-amino-4-t-butylthiazoles*

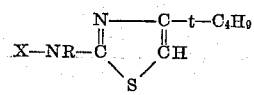

The following compounds were prepared in a manner analogous to Example 41:

| Ex. No. | Subst. phenylthiourea $X-NR-\overset{\overset{S}{\|}}{C}-NH_2$ | | | 1-bromo-3,3-dimethyl-butanone-2, parts by wt. | Product yield, parts by wt. | M.P., °C. | Crystallization solvent |
|---|---|---|---|---|---|---|---|
| | X | R | Parts by wt. | | | | |
| 42 | ⌬—OH | H | 9.0 | 9.0 | 12.4 | 145–145.5 | Benzene. |
| 43 | HO—⌬— | H | 9.0 | 9.0 | 14.5 | 178–179 | Benzene. |
| 44 | ⌬—OCH₃ | H | 9.2 | 9.0 | 11.5 | liq. | |
| 45 | CH₃O—⌬— | H | 9.0 | 9.0 | 11.0 | 117–119 | Hexane-benzene. |
| 46 | ⌬—OH (ortho) | H | 16.8 | 17.9 | 17.5 | 149–151 | Benzene. |
| 47 | naphthyl | H | 10.0 | 8.9 | 13.0 | 89–90 | Petrol. ether-hexane. |
| 48 | OH—⌬—t-C₈H₁₇ | H | 14.0 | 8.9 | 18.5 | 128–129 | Benzene-hexane. |
| 49 | (CH₃)₃C—⌬—C(CH₃)₃, OH | H | 5.0 | 3.2 | 5.0 | 113–114 | Petrol. ether. |
| 50 | OH—⌬— | ⌬ (phenyl) | 12.2 | 8.9 | 16.0 | 161–162.5 | Water isopropanol. |

| Ex. No. | Subst. phenylthiourea X—NR—C(=S)—NH₂ | | | 1-bromo-3,3-dimethyl-butanone-2, parts by wt. | Product yield, parts by wt. | M.P., °C. | Crystallization solvent |
|---|---|---|---|---|---|---|---|
| | X | R | Parts by wt. | | | | |
| 51 | phenyl-NH₂ (para) | H | 9.0 | 9.0 | 11.8 | 134–135 | Benzene. |
| 52 | phenyl-NH₂ (meta) | H | 16.7 | 17.9 | 15.0 | 101–102 | Carbon tetrachloride. |

*Example 53.—2-(o-hydroxyphenylamino)-4-n-hendecylthiazole*

1-bromotridecanone-2 (6.9 parts), whose preparation is described by Lutz et al. J. Org. Chem. 12 767 (1947), is dissolved in 25 parts by volume of benzene and is added to a dispersion of o-hydroxyphenylthiourea (4.5 parts) in 75 parts by volume of ethanol at 49–50° over a period of 5 to 10 minutes. The reaction mixture is heated at reflux (75°) for 3 hours and neutralized with 150 parts by volume of an aqueous solution containing 5 parts of sodium bicarbonate. The reaction mixture is extracted with ether, the extract being dried over anhydrous sodium sulfate. The residue, obtained after distillation of the ether, weighs 10.5 parts and is crystallized from isopropanol. 2-o-hydroxyphenylamino-4-n-hendecylthiazole, so obtained, melts at 122–123°.

*Examples 54–59.—Substituted 2-amino-4-hendecylthiazoles*

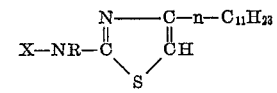

The following compounds were prepared in a manner analogous to Example 53:

| Ex. No. | Subst. phenylthiourea X—NR—C(=S)—NH₂ | | | 1-bromo-tridecanone-2, parts by wt. | Product yield, parts by wt. | M.P., °C. | Crystallization solvent |
|---|---|---|---|---|---|---|---|
| | X | R | Parts by wt. | | | | |
| 54 | phenyl-NH₂ (ortho) | H | 4.5 | 6.9 | 7.5 | 93–94 | Hexane. |
| 55 | NH₂-phenyl (meta) | H | 4.5 | 6.9 | 5.2 | 70–71 | Carbon tetrachloride. |
| 56 | OH-phenyl | H | 4.5 | 6.9 | 8.0 | 85–86 | Hexane. |
| 57 | phenyl-OCH₃ | H | 4.5 | 6.9 | 9.0 | 47–48.5 | Hexane. |
| 58 | OCH₃-phenyl | H | 4.5 | 6.9 | 9.0 | 58–60 | Petrol ether. |
| 59 | naphthyl | H | 2.9 | 4.0 | 5.4 | 58–60 | Isopropanol. |

2-ARYLAMINO-5-ALKYL THIAZOLES

*Example 60.—2-p-hydroxyanilino-5-n-pentylthiazole*

α-Bromoheptaldehyde (9.65 parts), as prepared and described by Yanovskaya et al., J. Gen. Chem. (USSR) 22, 1598–1602 (1952), C.A. 47 9257 (1953), is dissolved in 25 parts by volume of benzene and added dropwise at 25–30° over a period of 10 minutes to a dispersion of 8.4 parts of p-hydroxyphenylthiourea in 75 parts by volume of ethanol. The mixture is heated at reflux in a nitrogen atmosphere for 2 hours. The yellow reaction solution is then diluted with 150 parts by volume of water containing about 5 parts of sodium bicarbonate and thoroughly extracted three times with 80 parts by volume portions of ether. The combined ether extracts are washed with 150 parts by volume of water and dried over anhydrous sodium sulfate. The residue, obtained after the distillation of the ether (10 parts), is dissolved in ethanol, treated with gaseous hydrogen chloride while cooling, whereupon 7.5 parts of the hydrochloride of 2-p-hydroxyanilino-5-n-pentylthiazole crystallize. This hydrochloride melts at 152–154°. 7 parts of the hydrochloride are dispersed in water with sufficient ethanol to give a clear solution. The solution is neutralized with aqueous sodium bicarbonate. The precipitated base is extracted with ether, the ether extract being dried over anhydrous sodium sulfate. The sodium sulfate is filtered off and the ether removed by distillation. The residue is recrystallized from a solution of benzene and hexane, yielding pure 2-p-hydroxyanilino-5-n-pentylthiazole, melting at 105–106°.

*Example 61.—2-o-hydroxyanilino-5-n-penylthiazole*

α-Bromoheptaldehyde (9.65 parts), as prepared and described by Yanovskaya et al., J. Gen. Chem. (USSR) 22 1598–1602 (1952), C.A. 47 9257 (1953), is dissolved in 25 parts by volume of benzene and added dropwise at 25–30° over a period of 10 minutes to a dispersion of 8.4 parts of o-hydroxyphenylthiourea in 75 parts by volume of ethanol. The mixture is heated at reflux in a nitrogen atmosphere for 2 hours. The reaction solution is then diluted with 150 parts by volume of water containing 5 parts of sodium bicarbonate and thoroughly extracted in 3 portions of 80 parts by volume of ether. The combined ether extracts are washed with 150 parts by volume of water, the ether layer being dried over anhydrous sodium sulfate. The residue, obtained after distillation of ether (13.7 parts), is recrystallized from hexane-benzene, yielding 2-o-hydroxyanilino-5-n-pentylthiazole of a melting point of 90–92°.

If, in Example 61, α-chloropropionaldehyde (4.6 parts) is substituted for α-bromoheptaldehyde, then 2-o-hydroxyanilino-5-methylthiazole is obtained.

If, in Example 61, α-chlorotetradecanal (12.3 parts) is substituted for α-bromoheptaldehyde, then 2-o-hydroxyanilino-5-dodecylthiazole is obtained.

If, in Example 61, α-chloroeicosanal (16.5 parts) is substituted for α-bromoheptaldehyde, then 2-o-hydroxyanilino-5-o-octadecylthiazole is obtained.

*Example 62.—2-o-hydroxyanilino-4-methyl-5-t-butylthiazole*

4,4-dimethyl-3-chloropentanone-2 (5.0 parts), as described by Fierens, Bull. Soc. Chim. Belg. 64 772 (1955), is dissolved in 25 parts by volume of benzene and added dropwise at 25–30° to a dispersion of o-hydroxy-phenylthiourea (5.6 parts) in 75 parts by volume of ethanol. The reaction mixture is heated at reflux (75°) under nitrogen for 2½ hours. The clear yellow reaction solution is diluted with 150 parts of water containing 5 parts of sodium bicarbonate and extracted with 3 portions of 70 parts by volume of ether. The ether extract is dried over anhydrous sodium sulfate. The ether is then distilled off and the residue (3.0 parts) is recrystallized from 1:1 isopropanol-petroleum ether, yielding unreacted o-hydroxy-phenylthiourea. The residue from the filtrate is recrystallized from n-hexane, yielding pure 2-o-hydroxyanilino-4-methyl-5-t-butylthiazole, melting at 133–135°.

If, in Example 62, 2,2 - dimethyl-3-chlorodecanone-4 (7.4 parts) is substituted for 4,4-dimethyl-3-chloropentanone-2, then 2-o-hydroxyanilino-4-hexyl-5-t-butylthiazole is obtained.

If, in Example 62, 2,2-dimethyl-3-chlorooctadecanone-4 (11.2 parts) is substituted for 4,4-dimethyl-3-chloropentanone-2, then 2-o-hydroxyanilino-4-dodecyl-5-t-butylthiazole is obtained.

If, in Example 62 (2,2-dimethyl-1-chloropropyl)-octadecylketone (12.8 parts) is substituted for 4,4-dimethyl-3-chloropentanone-2, then 2-o-hydroxyanilino-4-octadecyl-5-t-butylthiazole is obtained.

N,N'-PHENYLENE-BIS-(2-AMINO-4-SUBSTITUTED THIAZOLES)

*Example 63.—N,N'-p-phenylene-bis-(2-amino-4-t-butylthiazole)*

1-bromo-3,3-dimethylbutanone-2 (15.0 parts), as described by J. B. Dickey et al., J. Org. Chem. 20 499–500 (1955), is dissolved in 25 parts by volume of benzene and the benzene solution is added dropwise at 35° to a dispersion of p-phenylenedithiourea (9.0 parts) in 100 parts by volume of methyl Cellosolve over a period of 20 minutes. After the addition, the reaction mixture becomes homogeneous and is heated at reflux for 4½ hours in a nitrogen atmosphere. The reaction solution is then poured into 150 parts by volume of water containing 4 parts of sodium hydroxide, and is extracted with 4 portions of 60 parts by volume of ether. The combined ether extracts are washed with 200 parts by volume of water, and filtered to remove a small amount of insoluble precipitate. The clear ether solution is dried over anhydrous sodium sulfate and the desired product (14 parts) is isolated by recovery of the residue upon distillation of the ether. The N,N'-p-phenylene-bis-(2-amino-4-t-butylthiazole) is purified by successive crystallization from 1,2-dichlorethane and benzene and has a melting point of 199–202°.

In a fashion similar to Example 63, other N,N'-p-phenylene-bis-(2-amino-4-substituted thiazoles) are made as follows:

If, in Example 63, 1-chlorotetradecanone-2 (19.7 parts) is substituted for 1-bromo-3,3-dimethylbutanone-2, then N,N'-p-phenylene-bis-(2-amino-4-dodecylthiazole) is obtained.

If, in Example 63, 1-chloroeicosanone-2 (26.4 parts) is substituted for 1-bromo-3,3-dimethylbutanone-2, then N,N' - p-phenylene-bis-(2-amino-4-octadecylthiazole) is obtained.

Examples 64–67

In like manner, analogous to Example 63, other N,N'-phenylene-bis-(2-amino-4-substituted thiazoles) were made as follows:

| Ex. No. | Subst. phenylthiourea $X-NR-\overset{S}{\underset{\|}{C}}-NH_2$ | | | α-Haloketone, parts by wt. | Product $R_1-C-N$ ... $N-C-R_1$ | | | |
|---|---|---|---|---|---|---|---|---|
| | X | R | Parts by wt. | | $R_1$ | Parts by wt. | M.P., °C. | Crystallization solvent |
| 64 | -⟨⟩-N(R)-C(S)-NH₂ | H | 11.3 | ClCH₂COCH₃  9.2 | CH₃ | 5 | 227–229 | Methanol isopropanol. |
| 65 | ⟨⟩-N(R)-C(S)-NH₂ | H | 5.5 | ClCH₂COCH₃  5.0 | CH₃ | 1.3 | 167–168 | Isopropanol. |
| 66 | ⟨⟩-NR-C(S)-NH₂ | H | 11.3 | ClCH₂COC₆H₅  15.4 | C₆H₅ | 15 | 135–136 | Carbon tetrachloride. |
| 67 | -⟨⟩-NR-C(S)-NH₂ | H | 24 | ClCH₂COC₆H₅  31 | C₆H₅ | 31 | 228–229 | Isopropanol. |

Example 68.—N,N'-p-phenylene-bis-(2-amino-4-p-t-butylphenylthiazole)

p-t-Butylphenacyl chloride (21 parts) is dissolved in 45 parts by volume of benzene and added to a dispersion of 11.5 parts of p-phenylene-dithiourea in 100 parts by volume of ethanol over a period of 20 minutes at 50°. The reaction mixture is heated at reflux (74°) for 3 hours and then diluted with 100 parts by volume of water. The reaction mixture is made alkaline with about 150 parts by volume of 10% aqueous sodium hydroxide and extracted with ether. The ether is then distilled off and the crude residue washed with methanol; it melts at 250°. The N,N'-p-phenylene-bis-(2-amino-4-p-t-butylphenylthiazole), so obtained, is recrystallized from ethylene chloride, giving white crystals melting at 253–255°.

Example 69.—N,N'-bis-(4-p-t-butylphenyl-2-thiazolyl)-N-phenyl-p-phenylenediamine p-t-Butylphenacyl chloride (19.0 parts) is dissolved in 50 parts by volume of benzene and added dropwise to a dispersion of 13.6 parts of N-phenyl-p-phenylene-dithiourea in 77 parts of methyl Cellosolve at 28° over a period of 10 minutes. The reaction mixture is heated at 80° for 3½ hours and diluted with 100 parts of 5% sodium bicarbonate. The reaction mixture is extracted with 4 portions each of 80 parts by volume of ether, the combined ether extracts being washed with water and dried over anhydrous sodium sulfate. The ether is then distilled off and the residue (23 parts) is freed of a small amount of a soluble contaminant by extraction with hot hexane. The hexane-insoluble fraction (19 parts) is recrystallized from a solvent mixture of isopropanol and benzene. The N,N'-bis-(4-p-t-butylphenyl-2-thiazolyl)-N-phenyl-p-phenylenediamine, so obtained, melts at 219–220°.

2-ARYLAMINO-TETRAHYDROBENZOTHIAZOLES

Example 70.—2-o-hydroxyanilino-4,5,6,7-tetrahydrobenzothiazole 2-chlorocyclohexanone (13 parts) and o-hydroxyphenylthiourea (16.8 parts) are dispersed in 150 parts by volume of ethanol, and the dispersion is heated at reflux for about 3 hours. The reaction mixture is then diluted with an equal amount of water and neutralized with aqueous sodium bicarbonate. It is then extracted with ether, the ether extract being dried over anhydrous sodium sulfate. The residue from ether is isolated by distillation of the ether and is recrystallized from isopropanol. The 2-o-hydroxyanilino-4,5,6,7-tetrahydrobenzothiazole melts at 191–192°.

Examples 71–73

The following 2-substituted anilino-4,5,6,7-tetrahydrobenzothiazoles were made using the same process as in Example 70:

| Ex. No. | Subst. phenylthiourea X—NH—C(=S)—NH₂ | | 1-chloro-cyclo-hexanone, parts by wt. | Product X—NH—C(thiazole fused cyclohexane) | | |
|---|---|---|---|---|---|---|
| | X | Parts by wt. | | Parts by wt. | M.P., °C. | Crystallization solvent |
| 71 | naphthyl | 20.2 | 13.0 | 10 | 188–189 | Ethanol. |
| 72 | phenyl-NH₂ | 16.7 | 13.0 | 6 | 184 | Isopropanol. |
| 73 | phenyl-OH | 16.8 | 13.2 | 8 | 164–165 | Benzene. |

BIPHENYLENE-BIS-(2-AMINO-4-SUBSTITUTED THIAZOLES)

*Example 74.—N,N'-p-biphenylene-bis-(2-amino-4-t-butylthiazole)*

1-bromo-3,3-dimethylbutanone-2 (14.3 parts) is dissolved in 26 parts by volume of benzene and added dropwise over a period of 10 minutes at 27° to dispersion of p-biphenylene-bis-(2-thiourea) (12.8 parts) in 127 parts by volume of methyl Cellosolve. The reaction mixture is heated at 80° for 4 hours and then diluted with 300 parts by volume of water containing 10 parts of sodium bicarbonate, and well agitated. The mixture is extracted with ether, the ether extract being washed with water and dried over anhydrous sodium sulfate. The ether is distilled off and the N,N'-p-biphenylene-bis-(2-amino-4-p-t-butylthiazole) (16 parts) is crystalized from a mixture of benzene and chloroform; it melts at 243–244°.

*Examples 75–77*

In a similar fashion to Example 74, other N,N'-p-biphenylene-bis-(2-amino-4-substituted thiazoles) were made as follows:

| Ex. No. | bis-thiourea biphenylene Parts by wt. | α-Haloketone, parts by wt. | Product | | | |
|---|---|---|---|---|---|---|
| | | | R | Parts by wt. | M.P., °C. | Crystallization solvent |
| 75 | 12.8 | phenyl-COCH₂Cl 12.3 | phenyl | 15 | 276–278 | Pyridinebenzene. |
| 76 | 6.5 | n-C₁₂H₂₅-phenyl-COCH₂Cl 12.9 | n-C₁₂H₂₅-phenyl | 15 | 258–263 | Tetrahydrofuran-benzene. |
| 77 | 6.5 | CH₃(CH₂)₁₀C(O)—CH₂Br 11.1 | n-C₁₁H₂₃ | 12 | 149–151 | Chloroform. |

*Example 78*

Unstabilized polypropylene powder (Hercules Profax 6501) is thoroughly blended with 0.5% by weight of 2,2'-imino-bis-4-(p-t-butylphenyl)-thiazole made according to Example 32. The blended material is then milled on a two roller mill at 182° for 10 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. As evident from the table below, the composition of 0.5% by weight of 2,2'-imino-bis-4-(p-t-butylphenyl)-thiazole and polypropylene is stabilized against deterioration.

STABILIZATION OF POLYPROPYLENE AGAINST OVEN AGING AT 149°—CRAZING [1] TIME

| | Hours |
|---|---|
| Polypropylene alone | 3 |
| Polypropylene+0.5% stabilizer [2] | 500 |

[1] Crazing is the surface embrittlement (fine cracks on surface) which is an indication of oxidative deterioration.
[2] 2,2'-imino-bis-4-(p-t-butylphenyl)-thiazole (Ex. 32).

Other substituted thiazoles which are also effective at 0.5% by weight in polypropylene are:

2,2'-imino-bis-(4-hendecylthiazole) (Ex. 33)
2-(n-phenyl-p-hydroxyphenylamino) - 4 - phenylthiazole (Ex. 7)
2-(α-naphthylamino)-4-n-hendecylthiazole (Ex. 59)
2 - (α-naphthylamino) - 4 - (p-t-butylphenyl) - thiazole (Ex. 20)
N,N'-bis-(4-p-t-butylphenyl-2-thiazolyl) - N - phenyl-p-phenylenediamine (Ex. 69)
2 - (n-lauroyl-2-hydroxy-5-t-octylphenylamino)-4-phenylthiazole (Ex. 17)

In like manner, if either 2-(m-aminoanilino)-4-t-butylthiazole (Ex. 52) or 2-(m-aminoanilino)-4-phenylthiazole (Ex. 6) is incorporated into low-pressure polyethylene in an amount of 0.1% by weight, then the resultant composition is stabilized against deterioration.

In like manner also, if all the foregoing compounds according to Example 78, are incorporated into high impact polystyrene (Foster Grant Tuflex, X11516) by milling at 155° in an amount of 0.1% by weight, then the resultant compositions are stabilized against deterioration.

Example 79

A stabilized mineral oil composition is prepared by incorporating into a refined paraffin-type mineral oil of 183 S.U.S. at 100° F. (Regal Oil B, Texas Company) 0.05% by weight of the stabilizer 2-(p-aminoanilino)-4-t-butylthiazole (Ex. 41). The stability of this composition is tested by incorporating therein 20 parts per million of soluble copper as the naphthenate and placing the resultant mixture in a modified Sligh oxidation flask equipped with a mercury manometer (Davis et al., Ind. Eng. Chem., 33 339, March 1941). The flask is maintained in a constant temperature oil bath at 115°. The length of time for a pressure drop of 60 mm. from the maximum pressure noted is taken as the time of failure. The stabilized mineral oil does not fail after 96 hours, the blank failing after only 3½ hours.

Under the foregoing conditions of Example 79, mineral oil is effectively stabilized also by each of the following compounds:

2-(p-aminoanilino)-4-phenylthiazole (Ex. 4)
2-(m-aminoanilino)-4-phenylthiazole (Ex. 6)
2-(p-aminoanilino)-4-n-hendecylthiazole (Ex. 55)
N,N' - o - phenylene - bis - (2 - amino-4-methylthiazole) (Ex. 65)

Example 80

Stabilized gasoline is prepared by incorporating into gasoline, having no additives and no stabilizers therein, 0.05% by weight of 2-(p-aminoanilino)-4-t-butylthiazole (Ex. 41). The gasoline, with and without stabilizer, is tested by the oxygen bomb induction period method (ASTM D525–55), wth the result that the gasoline with stabilizer has not failed after 500 minutes, while the blank fails after 250 minutes.

Example 81

Stabilized lard is prepared by incorporating in lard (Tobin Packing Co.) 0.01% by weight of 2-(p-aminoanilino)-4-t-butylthiazole (Ex. 41). The lard, with and without stabilizer, is tested by the ogygen induction period method (ASTM D525–55) with the following modifications: 15 parts of lard sample are tested; the end point is defined as the mid-point of the first hour, in which a pressure drop of 2 lbs. per square inch or greater is noted, followed by an equivalent or greater drop in the succeeding hour. The stabilized lard does not fail after 500 minutes, while the unstabilized lard fails after 108 minutes.

Lard is also stabilized with each of the following antioxidants:

2-(o-aminoanilino) - 4 - (n-dodecylphenyl)-thiazole (Ex. 29)
2-(p-aminoanilino)-4-methylthiazole (Ex. 36)

If cotton seed oil (refined, Welch, Holme and Clark) is substituted for lard in the foregoing test and as stabilizer 2-(o-aminoanilino) - 4 - (n-dodecylphenyl)-thiazole (Ex. 29) is used, then the cotton seed oil containing stabilizer does not fail after 500 minutes, while the unstabilized cotton seed oil fails after 282 minutes.

Example 82

High temperature lubricant (diisoamyladipate) is stabilized by incorporating therein 2% by weight of 2-(p-aminoanilino)-4-t-butylthiazole (Ex. 41) into said lubricant. The resultant stabilized lubricant composition is compared with the unstabilized lubricant by heating at 175° in presence of air and metallic catalysts according to the test method described in Military Specification Mil-L-7808c. After 72 hours the blank contains 83% sludge and has increased significantly in acidity. The stabilized lubricant, however, contains less than 15% of sludge and shows no increase in acidity.

Example 83

Heptaldehyde is stabilized by incorporating into the freshly distilled aldehyde 0.01% by weight of 2,2'-iminobis-(4-t-butylphenyl)-thiazole (Ex. 32). The stabilized heptaldehyde is shaken in an oxygen atmosphere in the dark under normal pressure at room temperature (23°). The time necessary for absorption of 30 parts by volume of oxygen in 25 parts of heptaldehyde is 89 hours for the stabilized heptaldehyde, but only ¼ hour for heptaldehyde alone.

Heptaldehyde is also effectively stabilized by each of the following compounds:

2-(m-aminoanilino)-4-t-butylthiazole (Ex. 52)
2-(o-aminoanilino)-tetrahydrobenzothiazole (Ex. 72)

Example 84

Cyclohexene, freshly distilled, is stabilized by addition thereto of 0.001% by weight of the stabilizer 2-(p-aminoanilino)-4-t-butylthiazole (Ex. 41). The effectiveness of this antioxidant in cyclohexene is tested by the ASTM D525–55 oxidation test with the modification that only 10 parts by volume of cyclohexene are used in each bomb. The stabilized cyclohexene runs more than 200 minutes without failure, while unstabilized cyclohexene fails after 30 minutes.

Cyclohexene is also stabilized by each of the following compounds:

2-(o-hydroxyanilino)-4-t-butylthiazole (Ex. 42)
2-(p-hydroxyanilino)-4-t-butylthiazole (Ex. 43)
2-(2-hydroxy-5-t-octylanilino)-4-t-butylthiazole (Ex. 48)
2(o-aminoanilino)-tetrahydrobenzothiazole (Ex. 72)

In like manner to cyclohexene, tetralin is stabilized with 0.001% by weight of each of the following compounds:

2-(2-hydroxy-5-t-octylanilino)-4-t-butylthiazole (Ex. 4)
2-(p-hydroxyanilino)-4-p-n-dodecylphenylthiazole (Ex. 27)

*Example 85*

Paraffin wax (M.P. 125–128°) is stabilized by incorporating therein 0.001% by weight of 2-(p-aminoanilino)-4-t-butylthiazole (Ex. 41). The effective stabilization is illustrated by the following odor test: The stabilized paraffin is heated at 121° in the presence of air. A like amount of unstabilized paraffin wax is also heated under the same conditions. After 18 hours, there is no perceptible odor for the stabilized wax. The unstabilized wax, however, exhibits a distinct odor.

Paraffin wax is also stabilized by 0.001% by weight of each of the following compounds:

2-(p-aminoanilino)-4-methylthiazole (Ex. 36)
2-(o-hydroxyanilino)-4-p-n-dodecylphenylthiazole (Ex. 26)

*Example 86*

Stabilized rubber is prepared by mixing in the cold:

100.00 parts Hevea latex crepe
1.5 parts stearic acid
5.0 parts zinc oxide
1.0 part diphenylguanidine
2.5 parts sulfur
1.0 part 2-(p-hydroxyanilino)-4-t-butylthiazole (Ex. 43)

The resultant mixture is vulcanized at 140° and tested according to ASTM D-1206-53T. The time required to elongate a test strip from 120 mm. to 170 mm. is 8½ hours for the unstabilized rubber, and more than 35 hours for the stabilized rubber. In a similar way polyisoprene rubber and styrenebutadiene rubber are stabilized.

The rubber of Example 86 is stabilized in like manner, if 1.0 part of one of the following compounds:

2-(o-hydroxyanilino)-4-t-butylthiazole (Ex. 42); or
2-(p-hydroxyanilino)-4-(p-n-dodecylphenyl)-thiazole (Ex. 27); or
2-(p-aminoanilino)-4-phenylthiazole (Ex. 4)
  is substituted for 1.0 part of
2-(p-hydroxyanilino)-4-t-butylthiazole (Ex. 43).

It is understood that in the foregoing Examples 78–86 inclusive, compositions which comprise the oxidizable material of each of said examples therein, are stabilized by effective amounts of the new compounds, prepared according to the preceding Examples 1–77 inclusive.

This application is a division of Serial No. 104,805, filed April 24, 1961, which in turn is a continuation-in-part of Serial No. 28,839, filed May 13, 1960.

What is claimed is:
1. 2,2'-imino-bis-(4-p-t-butylphenylthiazole).
2. 2-(α-naphthylamino)-4-p-t-butylphenylthiazole.
3. 2,2-'-imino-bis-(4-hendecylthiazole).
4. 2-(α-naphthylamino)-5,6,7,8-tetrahydro-benzothiazole.
5. 2-(α-naphthylamino)-4-n-hendecylthiazole.

References Cited in the file of this patent
UNITED STATES PATENTS

| | | |
|---|---|---|
| 2,134,436 | Cantrell et al. | Oct. 25, 1938 |
| 2,154,096 | Loane | Apr. 11, 1939 |
| 2,316,011 | Miller et al. | Apr. 6, 1943 |
| 2,863,874 | Gregory | Dec. 9, 1958 |
| 2,881,219 | Thompson | Apr. 7, 1959 |

OTHER REFERENCES

Bhatt et al.: Chem. Abstracts, vol. 43, page 3819 (1949).

Beyer et al.: Ber. Deut. Chem., vol. 89, pages 1602–8 (1956).

IRVING MARCUS, *Primary Examiner*.

JOHN D. RANDOLPH, WALTER A. MODANCE,
  *Examiners.*

UNITED STATES PATENT OFFICE
CERTIFICATE OF CORRECTION

Patent No. 3,192,225                                                        June 29, 196

John D. Spivack et al.

It is hereby certified that error appears in the above numbered patent requiring correction and that the said Letters Patent should read as corrected below.

Columns 7 and 8, TABLE II, under the column heading "Literature reference", line 3 thereof, for "(C.A. 1950 3285b) read -- (C.A. 1953 3258b) --; column 14, line 70, for "Examples 34-50", in italics, read -- Examples 34-35 --, in italics; columns 19 and 20, in the table, last column, opposite "Ex. No. 51, for "H Benzene" read -- Benzene --; column 29, line 1, for "2-(2-hydroxy-5-t-octylanilino)-4-t-butylthiazole (Ex. 4)" read -- 2-(p-aminoanilino)-4-phenylthiazole (Ex. 4) --.

Signed and sealed this 19th day of July 1966.

(SEAL)
Attest:

ERNEST W. SWIDER                                        EDWARD J. BRENNER
Attesting Officer                                               Commissioner of Patents